United States Patent
Dunning et al.

(10) Patent No.: US 6,505,894 B2
(45) Date of Patent: Jan. 14, 2003

(54) VEHICLE BRAKING

(75) Inventors: Simon Michael Dunning, Leamington Spa (GB); Paul Antony Fawkes, Coventry (GB)

(73) Assignee: Land Rover, Lighthorne (GB)

( * ) Notice: Subject to any disclaimer, the term of this patent is extended or adjusted under 35 U.S.C. 154(b) by 0 days.

(21) Appl. No.: 09/804,517

(22) Filed: Mar. 12, 2001

(65) Prior Publication Data

US 2001/0022470 A1 Sep. 20, 2001

(30) Foreign Application Priority Data

Mar. 14, 2000 (GB) .............................................. 0005986

(51) Int. Cl.⁷ ............................... B60T 8/26; B60T 8/62
(52) U.S. Cl. ....................................... 303/186; 303/9.62
(58) Field of Search ............................... 303/9.62, 9.69, 303/9.71, 140, 146, 186, 190, 191

(56) References Cited

U.S. PATENT DOCUMENTS

| 5,251,968 A | * | 10/1993 | Rath ......................... 303/9.62 |
| 5,281,012 A | * | 1/1994 | Binder et al. ............ 303/113.5 |
| 5,474,369 A | * | 12/1995 | Inagaki et al. .............. 303/146 |
| 5,480,221 A | * | 1/1996 | Morita et al. ............ 303/113.5 |
| 5,731,975 A | | 3/1998 | Nakashima |
| 5,947,224 A | * | 9/1999 | Koiuno ....................... 180/248 |

FOREIGN PATENT DOCUMENTS

| DE | 197 13 561 C1 | 5/1998 | |
| DE | 197 47 527 A1 | 4/1999 | |
| JP | 62120259 A | 6/1987 | |
| JP | 62299460 A | 12/1987 | |
| JP | 62-299460 | 12/1987 | |
| JP | 10-138908 A | 5/1998 | ........... B60T/13/66 |

* cited by examiner

Primary Examiner—Christopher P. Schwartz
(74) Attorney, Agent, or Firm—Davis & Bujold, P.L.L.C.

(57) ABSTRACT

In a vehicle braking system with electronic brake distribution the threshold level of slip of the rear wheels is increased when the front brake temperature is estimated to have increased to a level where brake fade will occur. This allows more braking torque to be applied to the rear wheels to counteract the brake fade at the front wheels. This increase in threshold slip is, however, overridden if the vehicle is cornering, as detected by a lateral accelerometer or a wheel speed difference across the vehicle, to avoid a reduction in vehicle stability during cornering.

7 Claims, 1 Drawing Sheet

VEHICLE BRAKING

FIELD OF THE INVENTION

The present invention relates to the braking of vehicles and in particular to improvements in the distribution of braking torque between the front and rear wheels of a vehicle under heavy braking.

BACKGROUND OF THE INVENTION

It is known to control electronically the level of braking torque applied to each wheel of a vehicle to achieve various desirable functions or braking characteristics. Generally these control strategies are based on a number of fundamental concepts. The degree of slip of a particular wheel, i.e. the difference between the wheel speed of that wheel and the actual speed of the vehicle, increases with the level of braking applied to the wheel. High levels of slip produce higher levels of braking, up to a point. Thereafter when slip becomes too high the wheel starts to lock up, the available traction, and hence braking, falls off, and the driver loses control of the vehicle.

ABS systems monitor the wheel speeds of the vehicle during braking and detect if one or more of the wheels starts to lock up, in which case braking torque to the locking wheel is reduced to avoid full wheel locking. Electronic brake distribution (EBD) systems are also known which control the distribution of braking torque between the front and rear wheels of a vehicle. These EBD systems allow for the fact that, under braking, a large proportion of the vehicle's weight is shifted to the front wheels, and therefore much more torque can be applied to them before they lock up than can be applied to the rear wheels. EBD systems therefore control the level of braking of the front and rear brakes so that the slip of the rear wheels is less than the slip of the front wheels. This maximizes the total level of braking available whilst minimizing the risk of instability due to slipping of the rear wheels.

It can be a problem with known EBD systems that under heavy braking the bias of the braking towards the front brakes, combined with fade of the front brakes due to their increasing temperature, can lead to a slight loss of effective braking. Various proposals have been made to address this problem, for example by redistributing brake torque in a manner which is dependent on brake temperature so as to compensate for fade. The present invention aims provide further improvements to such systems.

SUMMARY OF THE INVENTION

Accordingly the present invention provides a braking system for a vehicle having a front wheel and a rear wheel, the system comprising front braking means, which includes a friction surface, for applying a braking torque to the front wheel, rear braking means for applying a braking torque to the rear wheel, brake torque proportioning means for controlling the ratio of braking torque at the rear wheel to the braking torque at the front wheel, brake temperature determining means for determining the temperature of said friction surface of the front braking means, cornering detection means for detecting cornering of the vehicle, and control means arranged to increase the proportion of braking torque applied to the rear wheel in response to an increase in said temperature when the vehicle is travelling straight ahead, but to at least partially override said increase of the proportion of braking torque applied to the rear wheel if cornering of the vehicle is detected.

Preferably the control means is arranged to control the amount of slip of the rear wheels, and to increase the proportion of braking torque applied to the rear wheels by increasing the level of slip of the rear wheels.

Preferably the brake temperature determining means is arranged to estimate the brake temperature from at least one parameter indicative of the operation of the vehicle. The parameters may include the speed of at least one wheel of the vehicle and an indicator of the braking torque applied to at least one wheel of the vehicle. Alternatively the temperature may be directly measured.

The present invention further provides a braking system for a vehicle having a front wheel and a rear wheel, the system comprising a front brake, which includes a friction surface, for applying a braking torque to the front wheel, rear brake for applying a braking torque to the rear wheel, a modulator for controlling the ratio of braking torque at the rear wheel to the braking torque at the front wheel, brake temperature sensor for sensing the temperature of said friction surface of the front brake, cornering sensor for detecting cornering of the vehicle, and a controller arranged to increase the proportion of braking torque applied to the rear wheel in response to an increase in said temperature when the vehicle is travelling straight ahead, but to at least partially override said increase of the proportion of braking torque applied to the rear wheel if cornering of the vehicle is detected.

Preferred embodiments of the present invention will now be described by way of example only with reference to the accompanying drawings.

DETAILED DESCRIPTION OF THE PREFERRED EMBODIMENTS

Figure 1:
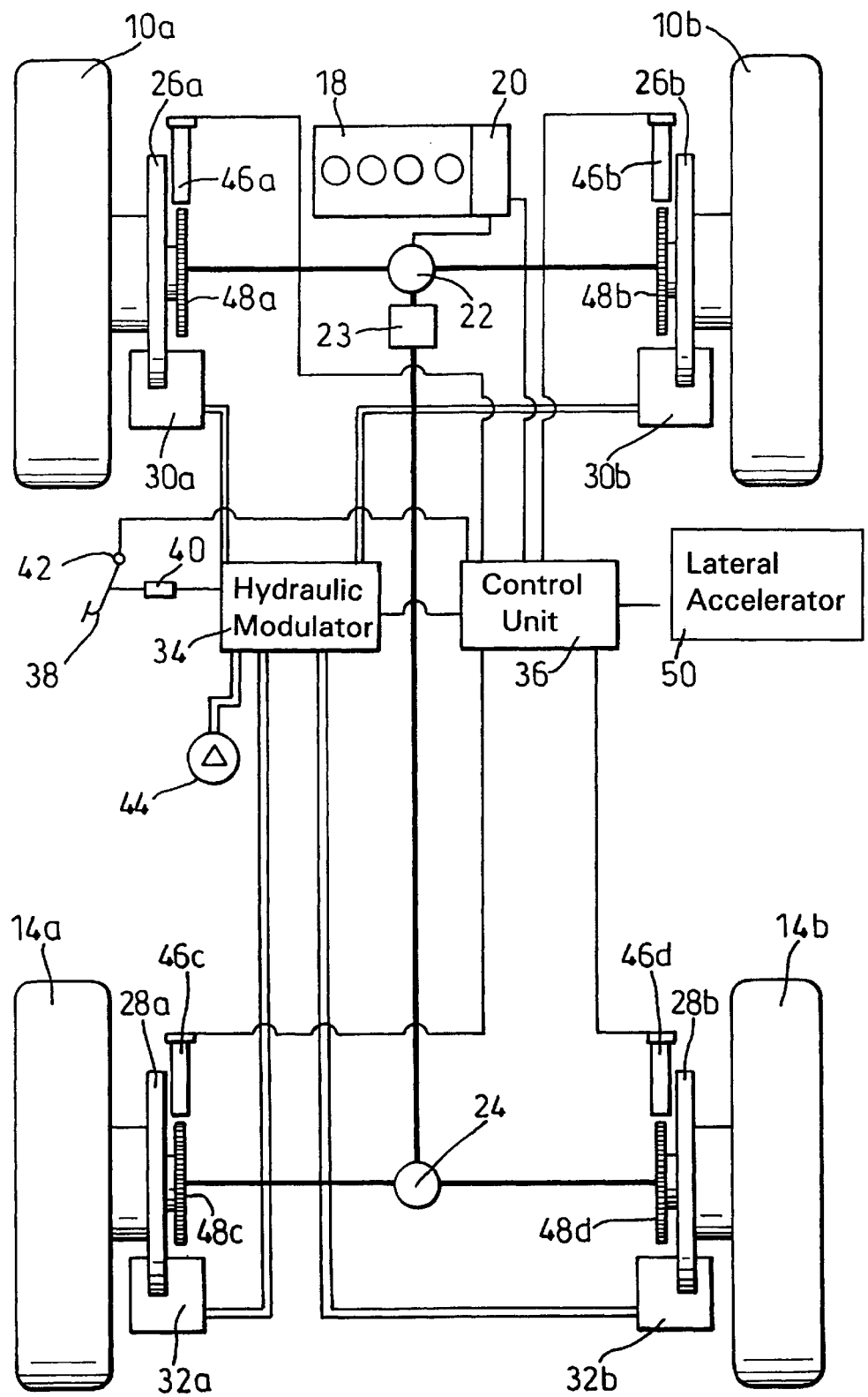
FIG. 1 is a diagrammatic representation of a vehicle including a braking system according to the invention.

Referring to the drawing, a vehicle has front wheels 10a, 10b and rear wheels 14a, 14b. Driving torque is provided to the wheels from an engine 18 via a gearbox 20 which drives the front wheels through a front differential 22. A viscous coupling 23 connects the front differential to a rear differential 24 so that driving torque is applied to the rear wheels 14a, 14b if the speed of the front wheels 10a, 10b increases above that of the rear wheels, i.e. if the front wheels are spinning.

Front brake discs 26a, 26b are mounted for rotation with the front wheels 10a, 10b and rear brake discs 28a, 28b for rotation with the rear wheels 14a, 14b. Front brake callipers 30a, 30b and rear brake callipers 32a, 32b are provided for applying braking torque to the discs 26a, 26b, 28a, 28b, the callipers being hydraulically actuated from a hydraulic modulator 34 under the control of a brake control unit 36. A brake pedal 38 is connected to a master cylinder 40 which provides a supply of brake fluid pressure to the modulator 34 and acts as a source of braking force. The position of the brake pedal 38 is also sensed by a pedal sensor 42 which provides a signal to the control unit 36 indicative of the position of the brake pedal 38. A hydraulic/pump 44 is connected to the modulator 34 to provide an additional source of hydraulic pressure and hence braking force. Wheel speed sensors 46a, 46b, 46c, 46d monitor the rotation of toothed discs 48a, 48b, 48c, 48d mounted on the wheels and hence measure the speed of rotation of each of the wheels 10, 14. Signals from the wheel speed sensors 46a, 46b, 46c, 46d are input to the control unit 36. A lateral accelerometer 50 also provides an input signal to the control unit 36 indicative of the level of cornering of the vehicle.

During braking, when the driver depresses the brake pedal 38, usually with the aid of a brake booster, this inputs a hydraulic pressure to the modulator 34. For low levels of braking this pressure is distributed approximately evenly between the wheels 10a, 10b, 14a, 14b. However the control unit 36 monitors the wheel speeds of all the wheels and determines from them, in a known manner, the vehicle speed and the level of slip of each wheel. Under normal EBD operation, the braking torque applied to the rear wheels 14a, 14b and the level of slip of the rear wheels is monitored to detect when the rear wheel braking torque is sufficient to increase the level of rear wheel slip to a predetermined threshold level, which can either be a fixed quantity expressed, for example as a number of rotations per second or an equivalent vehicle speed, or a percentage of the actual vehicle speed. If the level of rear wheel slip does exceed this threshold slip level, then the control unit 36 reduces the level of braking to the rear wheels so as to bring the slip level back down to the threshold level.

This normal EBD operation is, however modified under some circumstances, as will now be explained. During braking the control unit monitors various parameters indicative of the operation of the vehicle which affect the temperature of the front brake discs 26a, 26b and hence makes a running estimate or model of the front brake disc temperature. This process is already known and will not be described in detail. However the model can generally be operated from measurements of the front wheel speeds as measured by the speed sensors 46a, 46b and the braking torque or brake fluid pressure for the front wheels, as determined by the control unit 36. Obviously the model must be adapted to a particular brake system taking into account its specific characteristics such as the size and amount of ventilation of the discs and the materials of the discs and brake pads.

When the estimated temperature of the front discs 26a, 26b reaches a level at which brake fade starts to occur, the effect of this combined with the normal EBD function can limit undesirably the total amount of braking produced. Therefore the control unit increases the threshold rear wheel slip level of the EBD function as the brake temperature increases further. In this example when the estimated disc temperature reaches 400° C. the threshold slip level is increased by a fixed amount, say 1.5 kph above the base threshold level. Then for each further increase in estimated temperature of 50° C. the threshold slip level is increased by a further fixed amount of, say, 0.5 kph. The effect of this is to increase the braking torque that can be applied to the rear wheels, thus offsetting the reduction in braking torque from the front brakes resulting from the increasing disc temperature.

However, it will be appreciated that a further effect of increasing the threshold rear slip levels is to reduce the stability and controllability of the vehicle. If the vehicle is travelling in a straight line this is not a significant problem. However, if the vehicle is cornering it is more likely to result in undesirable slipping of the rear wheels. Therefore the control unit 36 is also arranged to monitor the degree of cornering of the vehicle using the lateral accelerometer 50. If the lateral acceleration of the vehicle exceeds a threshold cornering acceleration, then the modification to the EBD threshold slip levels are not implemented. Similarly of the threshold cornering acceleration is reached while the EBD system is actually operating, then the modification to the threshold slip levels is abandoned and the basic threshold slip levels reverted to.

It will be appreciated that various modifications to the system described above can be made. For example the change of threshold slip level in the EBD system could be increased linearly with increased front disc temperature, instead of in steps. The degree of cornering could be determined by other methods, for example by using a steering angle sensor in conjunction with the wheel speed sensors, or by measuring the difference in wheel speed between the wheels on one side of the vehicle and those on the other.

We claim:

1. A braking system for a vehicle having a front wheel and a rear wheel, the system comprising front braking means having a friction surface for applying a braking torque to the front wheel, rear braking means for applying a braking torque to the rear wheel, brake torque proportioning means for controlling a ratio of braking torque of the rear wheel relative to the braking torque of the front wheel, brake temperature determining means for determining a temperature of said friction surface of the front braking means, cornering detection means for detecting cornering of the vehicle incorporating the braking system, and control means arranged to increase the ratio of braking torque applied to the rear wheel in response to an increase in said temperature of said friction surface when the vehicle is traveling straight ahead, but to at least partially override said increase of the ratio of braking torque applied to the rear wheel if cornering of the vehicle is detected, wherein the brake temperature determining means is arranged to monitor at least one parameter indicative of the operation of the vehicle and to estimate said temperature from said at least one parameter.

2. The system according to claim 1, wherein said at least one parameter includes the speed of at least one wheel of the vehicle.

3. The system according to claim 2, wherein said at least one parameter includes an indicator of the braking torque applied to at least one wheel of the vehicle.

4. The system according to claim 1, wherein the control means is arranged to control the proportion of torque applied to the rear wheels by controlling a level of slip of the rear wheels and to increase the proportion of braking torque applied to the rear wheels by increasing said level of slip.

5. The system according to claim 1, wherein said at least one parameter includes-an indicator of the braking torque applied to at least one wheel of the vehicle.

6. A braking system for a vehicle having a front wheel and a rear wheel, the system comprising a front brake, having a friction surface, for applying a braking torque to the front wheel, rear brake for applying a braking torque to the rear wheel, a modulator for controlling a ratio of braking torque applied to the rear wheel relative to the braking torque applied to the front wheel, a cornering sensor for detecting cornering of the vehicle incorporating the braking system, and a controller arranged to monitor at least one parameter indicative of the operation of the vehicle and to estimate the temperature of said friction surface from said at least one parameter, and to increase the ratio of braking torque applied to the rear wheel in response to an increase in said temperature of said friction surface when the vehicle is traveling straight ahead, but to at least partially override said increase of the ratio of braking torque applied to the rear wheel if cornering of the vehicle is detected.

7. A braking system for a vehicle having a front wheel and a rear wheel, the system comprising at least one front brake which includes a friction surface for applying a braking torque to the front wheel, a rear brake for applying a braking torque to the rear wheel;

a brake torque proportioning device for controlling a ratio of braking torque applied to the rear wheel and a ratio of the braking torque applied to the front wheel;

a brake temperature determining device for determining a temperature of the friction surface of the front brake;

a cornering detection device for detecting cornering of the vehicle incorporating the braking system; and a control device for increasing the proportion of braking torque applied to the rear wheel in response to an increase in the temperature of the friction surface of the front wheel when the vehicle is traveling straight ahead, but to at least partially override the increase of the proportion of braking torque applied to the rear wheel if cornering of the vehicle is detected;

wherein the brake temperature determining device monitors at least one parameter indicative of operation of the vehicle and estimates the temperature of the friction surface of the front wheel from the at least one parameter.

* * * * *